United States Patent [19]
Birkedahl et al.

[11] Patent Number: 5,778,203
[45] Date of Patent: Jul. 7, 1998

[54] AIRCRAFT DISPLAY AND CONTROL SYSTEM WITH VIRTUAL BACKPLANE ARCHITECTURE

[75] Inventors: Byron F. Birkedahl, Glendale; Douglas G. Endrud, Peoria, both of Ariz.

[73] Assignee: Honeywell, Minneapolis, Minn.

[21] Appl. No.: 724,331

[22] Filed: Oct. 1, 1996

[51] Int. Cl.⁶ .................................................. G06F 13/00
[52] U.S. Cl. .................. 395/306; 395/280; 395/282; 395/309; 364/424.06
[58] Field of Search ................................ 395/281, 282, 395/306, 308, 309, 280; 364/424.06

[56] References Cited

U.S. PATENT DOCUMENTS

| | | | |
|---|---|---|---|
| 5,412,651 | 5/1995 | Gorshe | 370/85.9 |
| 5,426,774 | 6/1995 | Banerjee et al. | 395/182.14 |
| 5,544,329 | 8/1996 | Engel et al. | 395/826 |

*Primary Examiner*—Jack B. Harvey
*Assistant Examiner*—Jeffrey K. Seto
*Attorney, Agent, or Firm*—Brian C. Downs; Ronald E. Champion

[57] ABSTRACT

An aircraft control system improves system flexibility, scalability, redundancy, and separation. The system uses a "virtual backplane" architecture which maximizes system flexibility and scalability and allows easy integration of new functions. The architecture comprises four major elements: processing modules; input and output modules (i.e. I/O modules); database modules; and an aircraft wide system network. Inter module communication occurs via the aircraft wide system network thereby eliminating the need for point to point communication and making modules independent of physical location or what modular units (MUs) they are in. Predetermined periodic and deterministic broadcast techniques improve the safety and communications efficiency of the system.

18 Claims, 6 Drawing Sheets

AIRCRAFT DISPLAY AND CONTROL SYSTEM WITH VIRTUAL BACKPLANE ARCHITECTURE

BACKGROUND OF INVENTION

The present invention relates generally to aircraft control systems and more specifically to communications architecture used in aircraft control systems.

Aircraft control systems are some of the most complex and safety critical control systems made. The functions controlled by these systems range from relatively simple and non-critical functions such as cabin lighting and temperature control to complex flight critical functions such as flight controls and flight management systems. While they may perform different functions, all aircraft control systems are continually scrutinized for ways to reduce system weight, size, and cost.

Until recently, most aircraft control functions were federated. In these systems each function had a dedicated box (or line replaceable unit(LRU)) which contained the necessary processing and input/output(I/O) electronics to accomplish the function. Federated systems, for example, used separate LRUs for functions such as the autopilot, flight director, air data, inertial reference, navigation, and the like. The disadvantages of federated systems included excessive weight, large size, and high cost. The desire to reduce these disadvantages lead to integrated LRU systems.

Integrated LRU systems provided weight, size, and cost savings by integrating several functions into a single LRU. For example, all the processing and I/O electronics required for an autopilot, a flight management system, and a symbol generated would be integrated into a single LRU. This reduced the number of LRUs in an aircraft. It also reduced the weight, size, and cost of each function. However, integrated LRUs have the disadvantage of high cost to adapt the integrated LRU to new or different aircraft. Further, a failure in a single function required replacing the entire LRU.

Most recently, integrated modular avionics (IMA) systems were introduced to solve the disadvantages of integrated LRU systems. IMA systems replaced LRUs with cabinets. Most functions were implemented on one or two circuit cards within an IMA element which were merely inserted into the IMA cabinet. When a failure occurs, a single IMA element is replaced which is an improvement over replacing an entire LRU. This reduced costs by reducing spare parts inventories and reducing repair time. IMA systems also reduced weight, size, and cost by putting more functions into a IMA cabinets.

While IMA systems function quite well, they have several disadvantages including lack of flexibility.

One example of this lack of flexibility is in the inability to physically breakup or separate functions in a IMA cabinet. Because of the high degree of integration in the IMA cabinet, functions are not easily separated. Consequently, systems designers are virtually locked into a two or three IMA cabinet design.

Another example of IMA systems lack of flexibility is the difficulty in adding new functions outside the IMA cabinet. Because the data is not global external to the cabinet, a new function will not have ready access to required data. In order to get the necessary data to the new function, extensive redesign of the buses, I/O, and/or other functions may be required.

Aircraft control system costs would be reduced, redundancy of functions increased, availability of functions increased, and system flexibility improved by an aircraft control system architecture which solved the problems associated with the prior art.

Clearly there exists the need for a new aircraft control system architecture which can provide these improvements.

SUMMARY OF THE INVENTION

The invention discloses an aircraft control system which improves system flexibility, scalability, redundancy, and separation. The system uses a "virtual backplane" architecture which maximizes system flexibility and scalability and allows easy integration of new functions. The architecture comprises four major components: processing modules; input/output modules (i.e. I/O modules); database modules; and an aircraft wide system network. Inter module communication occurs via the aircraft wide system network thereby eliminating the need for point to point communication and making modules independent of physical location or what modular unit(MU) they are in. Predetermined periodic and deterministic broadcast techniques improve the safety and communications efficiency of the system.

The key concept behind the invention is that all modules in the system operate independently from each other and communicate through the system bus. With this concept it will be understood that modules are no longer tied to where they are physically located or what MU they are in.

A key element to the invention is the virtual backplane architecture. This communications architecture permits significant improvements in system design over the prior art. The architecture allows a high degree of system integration and scalability by allowing all data generated by any function or module within the system to be globally available to any other function or module. Data is not confined to within a modular unit, but rather is also available to any other modules in any other modular units connected to the system bus. This eliminates the need for many dedicated point-to-point wiring requirements and also allows seamless integration of functions across the entire network. The result are modules which are not tied to or limited in any way by their physical location or what MU they are in.

Modular units (MUs) house the majority of system components. The MUs are hardware cabinets containing field replaceable modules (e.g. circuit cards). Individual modules can perform various functions including processing, I/O, and data storage(i.e. database). Each MU also typically includes a power supply module and a network interface control module for handling communications between the modules and the system bus.

Using the invention, modules can function as building blocks of a complete system. If more processing is required it can be done by existing processors that have spare processing time thus eliminating the need for additional hardware. If excess processing is not available, additional processing modules can easily be added to the MU to provide the required processing. If a specific function requires additional processing, a processing module is added thus eliminating the need to re-host the function to a more powerful processor.

Similarly, I/O capability is easily upgraded by merely adding I/O modules as required. Since modules function independently, upgrading processing and I/O capabilities is simplified. External wiring connect directly to each I/O module and not through a single multipurpose connector for the MU. Thus, I/O changes only affect a corresponding module, rather than rippling into the unit's mother board and rear connector as in conventional packaging designs.

The invention essentially ties all system modules together (throughout the aircraft) such that they communicate as if they were in a single LRU, however, the invention allows the modules to be physically separated.

The term "backplane" is normally used in the computer and aviation industry to indicate a common communication connection to elements within a box, LRU, or cabinet. An example of a backplane is the PCI bus in a personal computer. The common theme of backplanes is that the data are locally constrained to within the cabinet, box, or LRU. Any information which goes outside each unit is selectively gatewayed to the outside world.

The invention creates a "virtual backplane" which not only ties together modules which are normally connected within an LRU, but also ties together modules across an aircraft wide bus. Thus the modules operate (and communicate) seamlessly in the aircraft-wide network independent of whether or not they happen to be in the same MU. The invention ties all system modules together as if they were connected to a backplane in a single MU.

Therefore, objects of the invention are to create a common architecture for all aircraft products and systems, maximize aircraft control system flexibility and scalability, allow easy integration of new functions, and allow easy federation of integrated systems into stand-alone products.

A feature of the invention is a communications network that functions like an aircraft wide backplane.

Another feature of the invention are modules which function and communicate independent of physical location.

Another feature is periodic data which is available to all modules.

Another feature are I/O modules which are located physically remote from the associated processing module.

Another feature are data base modules which can be accessed by any other module.

Yet another feature are displays which can function independently from modular units, LRUs or the like.

An advantage of the invention is increased system flexibility.

Another advantage is easy addition (or deletion) of processing, I/O, and database modules.

Another advantage is optimizing processing power of the system with the fewest number of processing modules.

Another advantage is the flexibility to utilize spare processing throughput for new functions.

Another advantage is reduced re-application costs due to reuse of common modules.

Yet another advantage is global, aircraft-wide, data availability.

Yet another advantage is physical location independent modules.

Yet another advantage is the ability to provide redundancy only where it is desired.

The significant features of the invention are illustrated in the figures and described more fully below.

DETAILED DESCRIPTION

Figure 1:
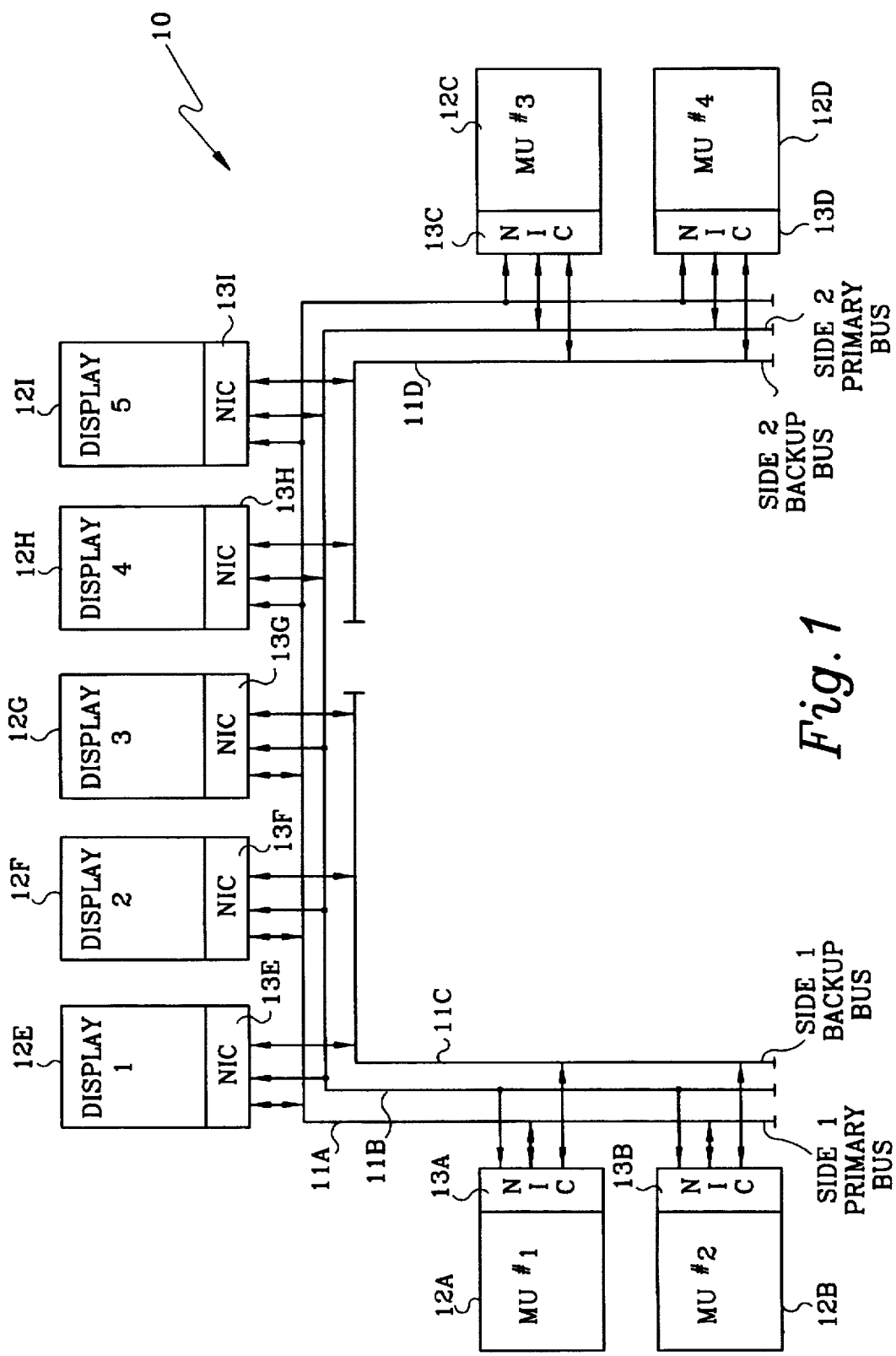
FIG. 1 is an overview of an aircraft control system incorporating the invention.

FIG. 1 is an overview of an aircraft control system 10 incorporating the invention. Shown in FIG. 1 are four system buses 11 and nine modular units (MUs). Modular units 12A–D are embodied as LRU or card cage type units and modular units 12E–I are embodied as being integrals parts of display heads.

Although the invention is equally applicable to a single system bus, the preferred embodiment uses four system buses 11 for redundancy. Side 1 primary bus 11A and side 2 primary bus 11B are coupled to all modular units 12. Backup buses 11C and 11D only communicate with MUs on their respective sides.

Each MU includes a network interface controller(NIC) 13 which handles communicates between modules in the MU and the system buses 11. NICs 13 include a memory which stores a schedule defining the predetermined periodic and deterministic communication of data on the system buses 11. NICs 13 are described in further detail below.

The NICs provide all communications on the system buses 11 to the modules in each MU. Because NICs provide such a common interface, it is understood that modules can be physically located in virtually any MUs attached to the system.

Figure 2:
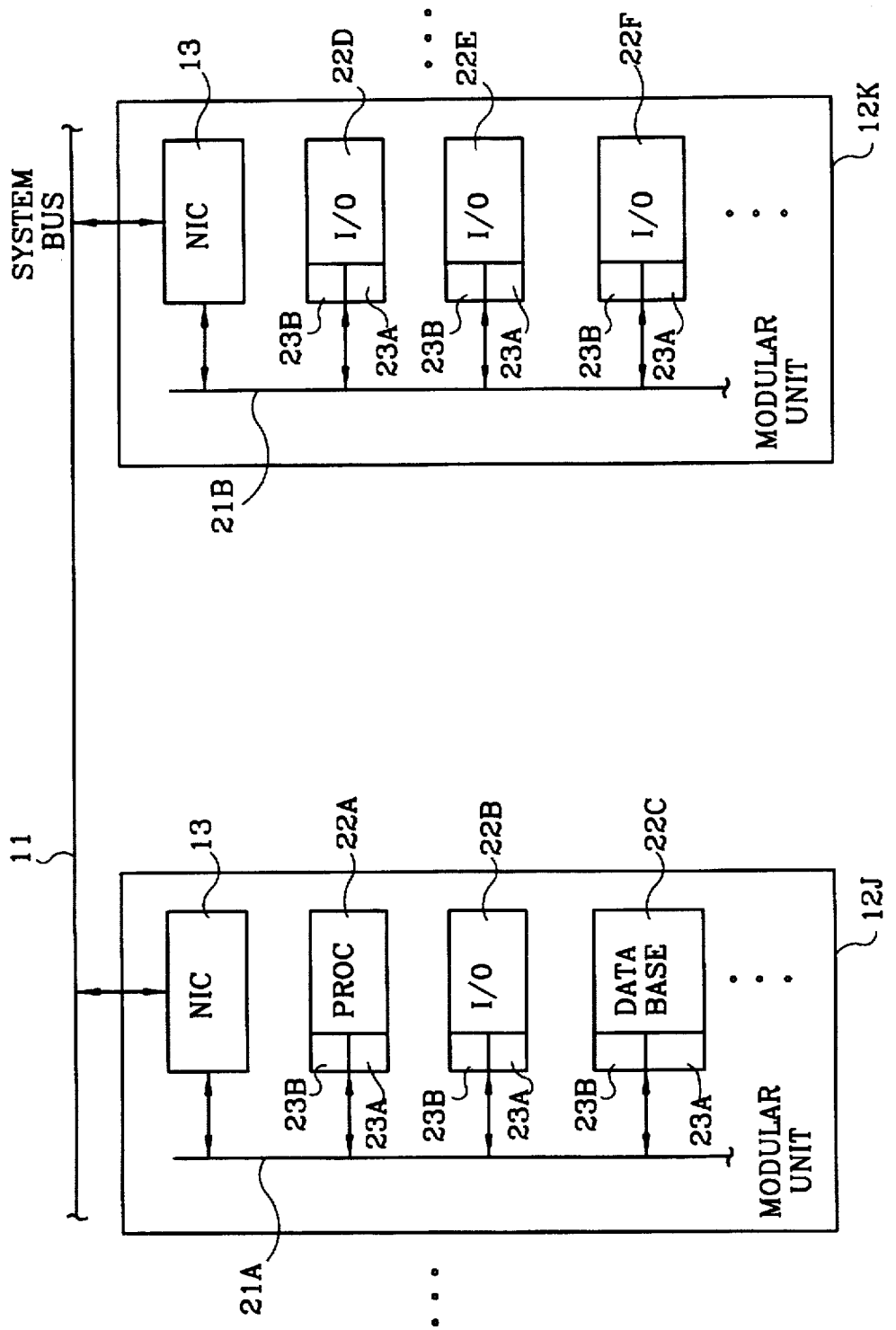
FIG. 2 shows details of two modular units.

FIG. 2 shows details of two modular units 12. Modular units 12J and 12K are coupled to a system bus 11 which also could be a redundant system bus. Each MU includes a NIC 13, a backplane bus 21, and several modules 22. NIC 13 provide the communications interface between system bus 11 and modules 22 as discussed elsewhere.

Modules 22 are preferably divided by function into three types: processor modules, I/O modules, and data base modules. Dividing modules into such distinct types increases system flexibility. Processor modules typically include a microprocessor or similar computing device and support circuitry. Processor modules provide the "brains" of the system. I/O modules interface provide the "senses" and "muscle" for the system. I/O modules can be specific to aircraft functions or be designed for use by multiple functions. I/O modules interface with various aircraft systems, sensors, and utilities including autopilot servos, pressure sensors, inertial reference sensors, alternate buses such as ARINC 429, and the like. Aircraft utilities include such functions as air conditioning, electrical power, fire protection, fuel, hydraulic power, ice and rain protection, indication and recording, landing gear, lights, oxygen, pneumatic, water/waste, auxiliary power, doors, propellers, ignition, air, oil, thrust reversers, and starting.

Each module has a common interface for interfacing between the functional portion (e.g. the processor circuitry, I/O circuitry, or data base circuitry) of the module and the NIC 13. The backplane interface 23 performs this function. Backplane interfaces 23 are standardized throughout the system to achieve flexibility and inter-changability. Backplane interfaces 23 include a transmitter portion 23A and a receiver portion 23B. The preferred embodiment uses shared memory or latch type devices to implement the transmitters 23A and receivers 23B.

Figure 3:
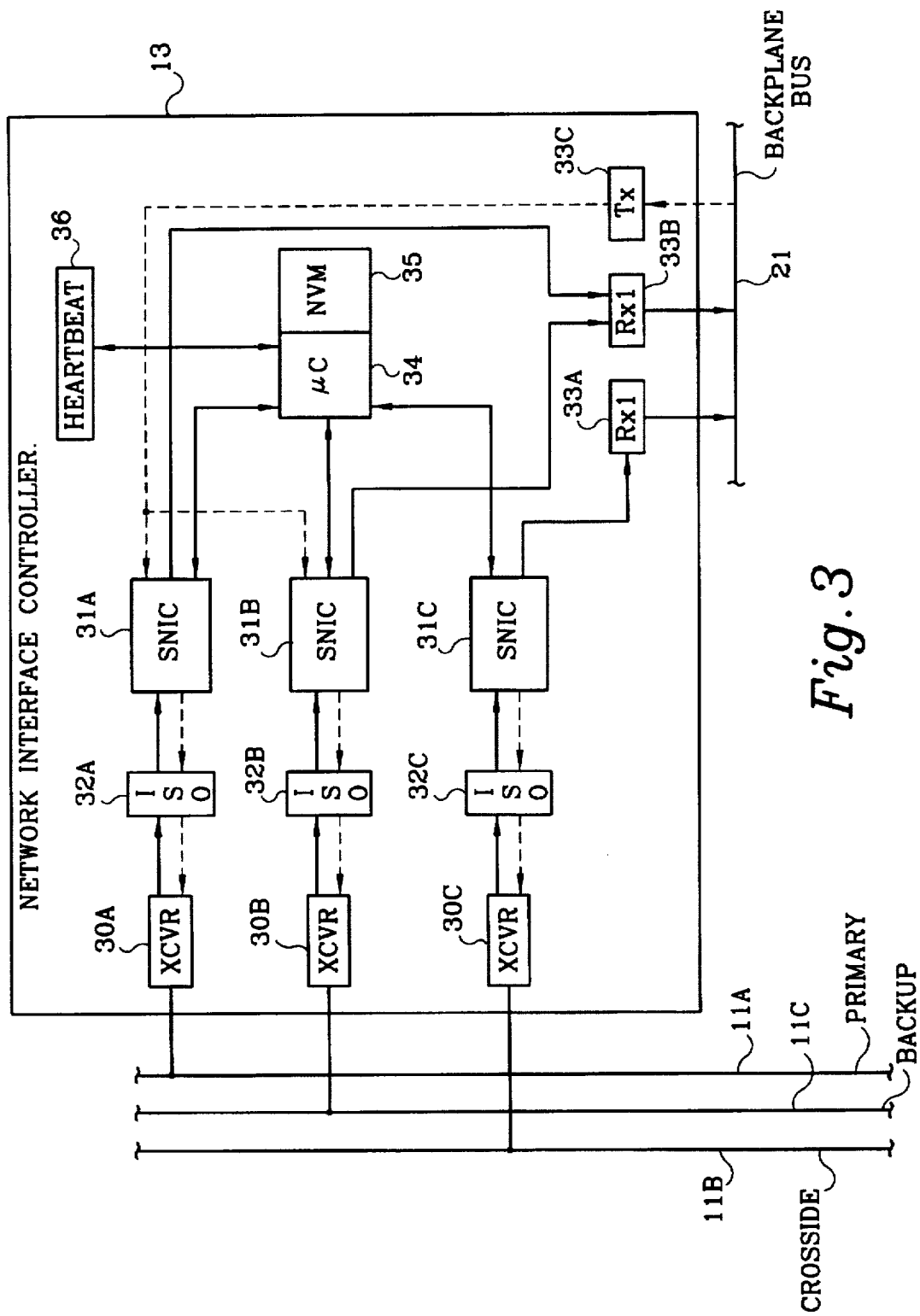
FIG. 3 shows details of a network interface controller (NIC).

FIG. 3 shows details of a network interface controller (NIC) 13 suitable for use in the present invention. The NIC 13 is essentially a transceiver coupled to each system bus 11.

In the embodiment shown, three transceivers 30A–30C are coupled to a primary or onside bus 11A, a backup bus 11C, and a cross-side bus 11B respectively. Each transceiver 30 is capable of receiving signals on the associated system bus and of communicating these signals to the internal NIC components. Conversely, each transceiver is also capable of receiving signals from the internal NIC components and transmitting these signals, or equivalents thereof, on the associated system bus.

Each transceiver 11 communicates with a system network interface controller(SNIC) 31 via an isolation buffer 32. SNICs 31 are capable of exchanging digital data between a transceiver 30 and random access memories functioning as data buffers 33. Two receive buffers 33A and 33B and a single transmit buffer 33C are provided.

Each buffer communicates with a backplane bus 21 which provides a communications link to the modules (not shown). Data stored in the receive may be made available to the modules by simulcasting or fanning out accumulated data across the backplane bus at predetermined time intervals. Alternatively, data stored in buffers 33A and 33B may be made available to the modules through a memory addressing scheme whereby each module intermittently polls each receiver buffer to determine if any received data is waiting. Alternatively, received data may be made available to the module by simulcasting or fanning out accumulated data across the backplane bus at predetermined time intervals.

Similarly, data that is to be transmitted by the NIC 13 on the system buses 11 is communicated across the MU internal backplane bus 21 to transmit buffer 33C. Data is placed in the transmit buffer 33C through either synchronous or asynchronous polling of backplane bus 21, or by data simulcast across the backplane bus 21 at regular or interrupt-driven intervals.

A key component of the invention is microcontroller 34 which controls the operation of SNICs 31. The microcontroller 34 sequences data transmissions on each system bus 11 according to predetermined data schedules stored in memory 35. The stored schedule is adapted to each implementation of the invention with each module being allocated a fixed amount of bandwidth in a predetermined sequence. Each module is guaranteed periodic access to the system buses 11 according to the stored schedule. Hence, communication across the system buses 11 is synchronous and deterministic. Because each NIC must respect the same timing sequence on the system buses, each NIC retains similar or identical schedules in memory. This system bus mechanism allows for improved reliability, since each module can anticipate and monitor the communications of all other participating modules. Moreover, each module is guaranteed periodic access to the system bus 11, thus insuring that critical messages are communicated without undue delay.

In the preferred embodiment a heartbeat monitor 36 monitors the operation of microcontroller 34. If a failure or power loss occurs, the heartbeat monitor 36 identifies the condition and takes appropriate actions such as disabling transmissions to prevent transmissions of corrupted data.

Further details the NICs 13 may be found in the co-pending patent application entitled "Low Cost Redundant Communication System", filed on Oct. 1, 1996, and assigned to the assignee of interest of this application. This co-pending application is hereby incorporated by reference.

Still further background material can be found in U.S. Pat. No. 4,063,220, entitled "Multipoint Data Communication System With Collision Detection" issued to Metcalfe et al. on Dec. 13, 1977 which is hereby incorporated by reference.

Figure 4:
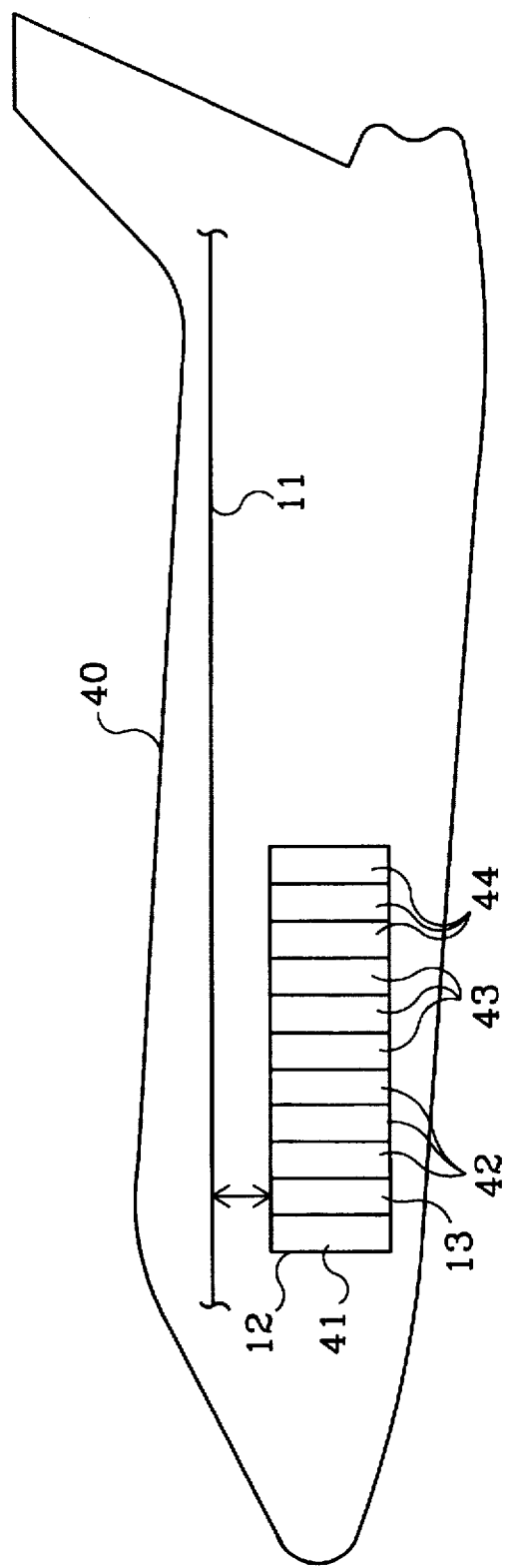
FIG. 4 illustrates functional concentration achieved using the invention.

FIG. 4 illustrates functional concentration achieved using the invention. This figure shows many functions combined or integrated into a single MU 12 inside of aircraft 40. Although applicant has discussed the advantages of physical separation of functions, the invention also supports unlimited functional concentration if it is desired. Therefore, if it is desired to concentrate several processing modules, I/O modules, and database modules in a single MU, the invention supports and simplifies this design.

Shown in FIG. 4 as part of MU 12 are power supply 41, processing modules 42, I/O modules 43, and database modules 44.

Figure 5:
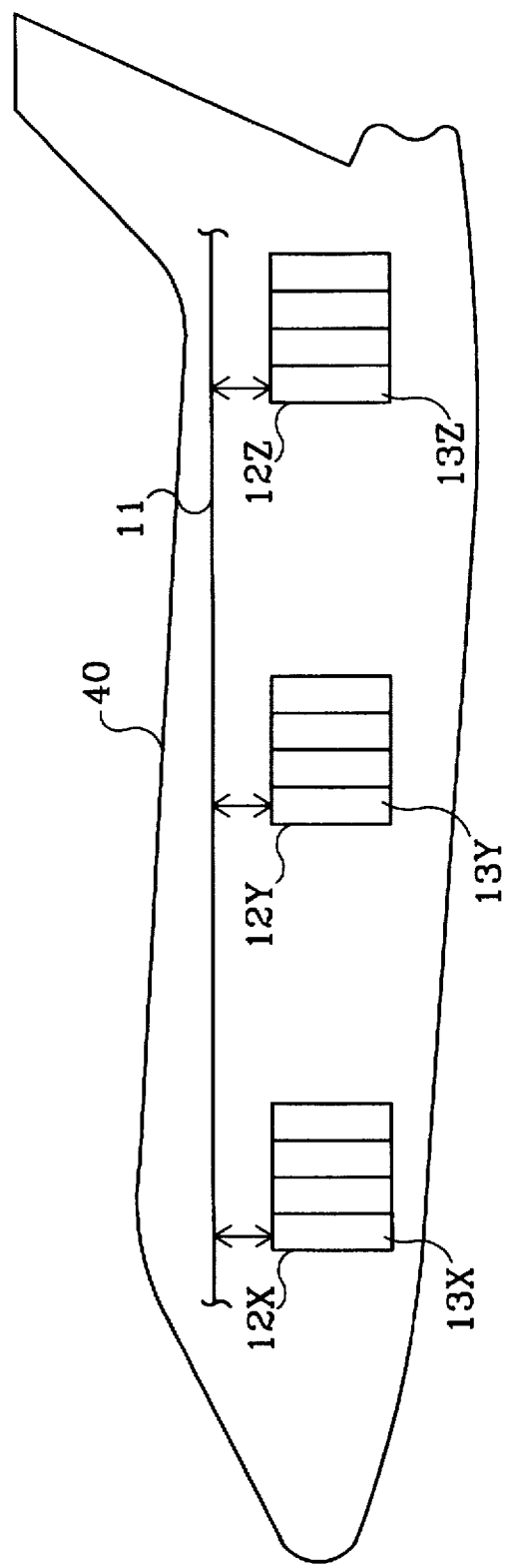
FIG. 5 illustrates two types of functional separation using the invention.

FIG. 5 illustrates two types of functional separation using the invention. Aircraft 40 is shown with three physically separated MUs 13 which are each connected to system bus 11. One type of functional separation could be achieved by putting all the modules required for a function in the same MU. For example each MU 13 could include a processing module, an I/O module and a database module for implementing a particular function or set of functions. Alternatively, it could be desirable to separate the functional modules and concentrate the similar modules. In this embodiment, for example, all the processor modules would reside in MU 13X, all the I/O modules would reside in MU 13Y, and all the database modules would reside in MU 13Z.

From these examples it should be apparent that the invention permits a large degree of flexibility in system design.

Figure 6:
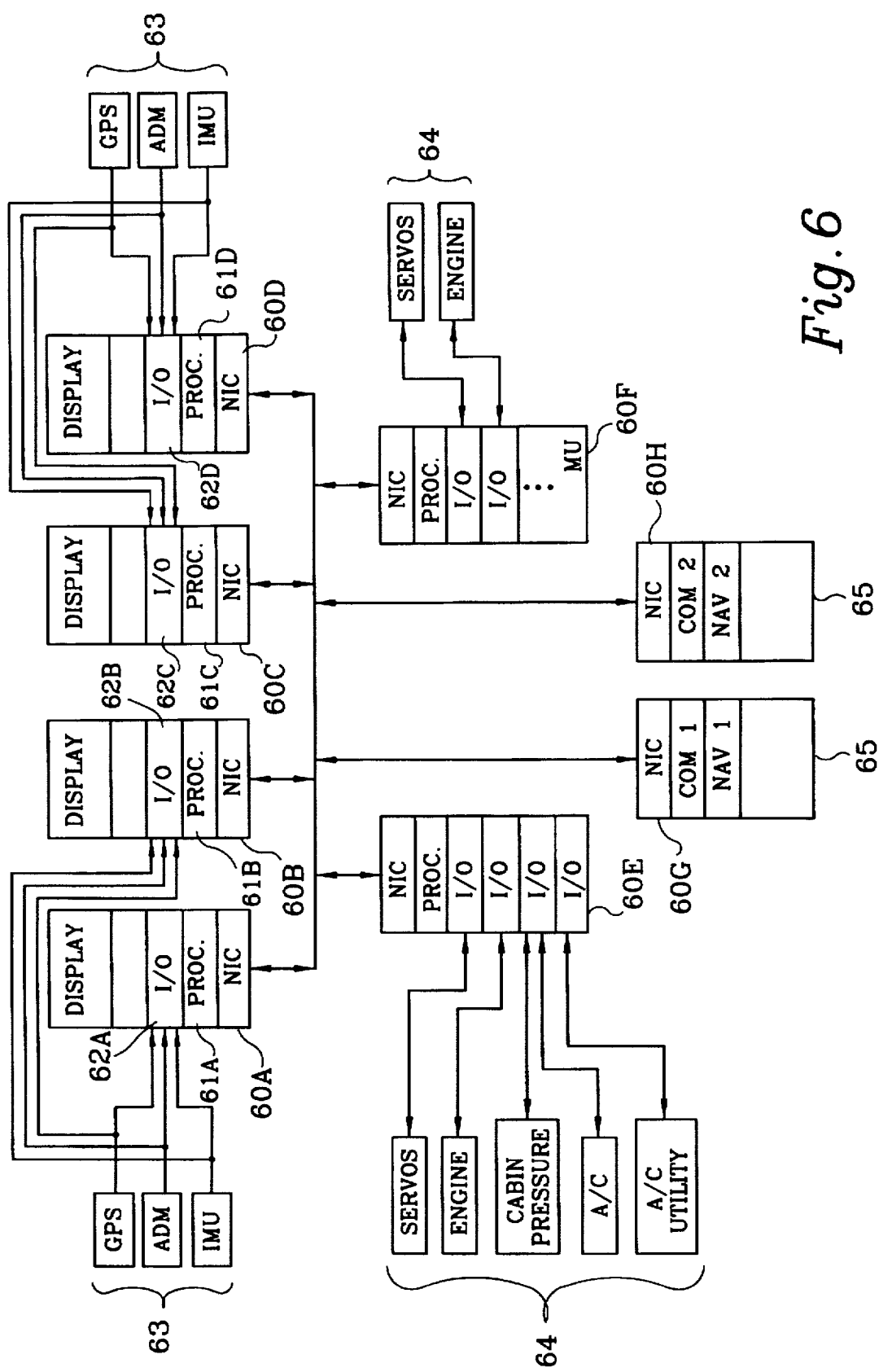
FIG. 6 shows the preferred embodiment of the invention.

FIG. 6 shows the preferred embodiment of the invention which incorporates many of the advantages discussed above.

Shown in FIG. 6 are eight MUs 60. An advantage of the invention is the flexibility to place modules in remote locations such as in display heads in an aircraft cockpit. In the figure, MUs 60A–60D are integral parts of heads. In this embodiment, the MU in each display head includes a processor module 61 and an I/O module 62. The I/O modules 62 receive data from aircraft sensors 63 which is processed by processing modules 61. Using this design, the display head are able to continue functioning and supplying critical data to a pilot even if MUs 60E–60F are lost. Aircraft sensors include GPS sensors, air data sensors (ADM), inertial reference sensors (IMU), and the like.

MUs 60E and 60F are shown with I/O cards interfacing with several aircraft systems 64. It should be noted that MUs 60E and 60F are shown having only one processing module even though several processor modules would normally be required to support the numerous I/O modules. However, the invention allows processing to be accomplished in any processing module in the system. For example, although engine I/O is shown in MU 60E, the processing of the I/O may be done in a display head such as MU 60C.

Also shown are MUs 60G and 60H which are an integral part of radio units 65.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention.

It is clear from the foregoing that the present invention represents a new and useful aircraft display and control system.

The embodiments of an invention in which an exclusive property or right is claimed are define as follows:

1. An aircraft control system for controlling a plurality of aircraft functions, said system comprising:

a) a virtual backplane bus having,
   1) a system bus,
   2) a plurality of network interface controllers coupled to said system bus, each of said interface controllers capable of synchronizing with other said interface controllers and transmitting and receiving predefined periodic and deterministic data across said system bus, and,
   3) a plurality of backplane buses, one of said backplane busses coupled to each of said interface controllers such that all of said predefined periodic and deterministic data is broadcast across said backplane bus;
b) a plurality of modules, each of said modules having,
   1) a functional portion, and,
   2) a backplane interface coupled with one of said backplane buses and in communication with said network interface controller for transmitting and receiving data across said system bus, said backplane interface having,
      a) a receiver portion having access to all said predefined periodic and deterministic data broadcast on said system bus, and,
      b) a transmit portion communicating intermodule data from said functional portion to said network interface controller.

2. The aircraft control system according to claim 1 wherein each of said network interface controllers includes a memory for storing a description of said predefined periodic and deterministic data, said description including timing and sequence information for said deterministic data.

3. The aircraft control system according to claim 2 wherein intermodule communications between said modules are accomplished the same regardless of which backplane bus each of said modules are physically coupled to.

4. The aircraft control system according to claim 3 wherein said plurality of modules include,
   a) at least one processing module;
   b) at least one I/O module; and,
   c) wherein at least one of said processing modules coupled to one of said backplane buses communicates to at least one of said I/O modules which is coupled to another of said backplane buses.

5. The aircraft control system according to claim 4 wherein said plurality of modules includes a data base module.

6. The aircraft control system according to claim 4 further comprising:
   a) at least two system buses, and,
   b) wherein said network interface controllers include bus switching means for controlling which system bus supplies said predefined periodic and deterministic data to the attached backplane bus.

7. The aircraft control system according to claim 6 wherein,
   a) said at least two system buses includes a crosside system bus; and,
   b) wherein the predefined periodic and deterministic data broadcast on said crosside system bus is broadcast on the backplane bus coupled to said network interface controller.

8. The aircraft control system according to claim 6 wherein at least one of said processing modules is physically located in a display head.

9. The aircraft control system according to claim 8 wherein said processing module physically located in a display head provides backup processing functionality for a processing module physically located in a separate modular unit.

10. The aircraft control system according to claim 6 wherein at least one of said I/O modules are physically located proximately to an aircraft system unit said I/O module communicates with thereby reducing wire length between said I/O module and said aircraft system unit.

11. The aircraft control system according to claim 6 wherein at least one of said processors modules provides processing for an aircraft utility function.

12. The aircraft control system according to claim 6 wherein said backplane interface is a shared memory which is shared between the functional portion of said module and the associated network interface controller.

13. The aircraft control system according to claim 5 wherein,
   a) at least one I/O module for receiving raw inertial reference data is physically located in a display head, and,
   b) at least one processing module for interpreting said inertial reference data is physically located in said display head.

14. An aircraft communications network comprising:
   a) a system bus;
   b) at least two modular units, each of said modular units having,
      1) a network interface controller capable of synchronizing with other said network interface controllers and transmitting and receiving predefined periodic data on said system bus, and,
      2) at least one module, each of said modules having an interface portion in communication with said network interface controller capable of transmitting and receiving data such that all intermodule communications are broadcast across said system bus.

15. A method of redundant control of aircraft systems comprising the steps of:
   a) providing an aircraft wide virtual backplane network, said network including,
      1) a system bus, and,
      2) at least two network interface controllers capable of synchronizing with other said network interface controllers and transmitting and receiving predefined periodic data on said system bus;
   b) providing at least two modules, each of said modules having a backplane interface portion and a functional portion, said interface portion having a receiver and a transmitter suitable for handling communication between one of said network interface controllers and said module such that all intermodule communications between said modules are broadcast across said system bus.

16. The method of redundant control of aircraft systems according to claim 15 wherein at least two of said modules which are processing modules, each of said processing modules in communication with separate interface controllers and having a redundant functionality such that any of said processing modules can perform said redundant functionality.

17. A method of redundant control of aircraft systems according to claim 15 wherein at least one of said modules is a remote I/O module physically located in close proximity to the aircraft system unit with which said I/O module communicates thereby reducing the length of communications line for communicating between said I/O module and said aircraft system unit.

18. A method of redundant control of aircraft systems according to claim 15 wherein a processing module functionally associated with said remote I/O module is physically separated from said remote I/O module and communicates with said remote I/O module across said system bus.

* * * * *

REEXAMINATION CERTIFICATE (3994th)

United States Patent [19]
Birkedahl et al.

[11] B1 5,778,203
[45] Certificate Issued Feb. 8, 2000

[54] AIRCRAFT DISPLAY AND CONTROL SYSTEM WITH VIRTUAL BACKPLANE ARCHITECTURE

[75] Inventors: Byron F. Birkedahl, Glendale; Douglas G. Endrud, Peoria, both of Ariz.

[73] Assignee: Honeywell Inc., Minneapolis, Minn.

Reexamination Request:
No. 90/005,381, Jun. 3, 1999

Reexamination Certificate for:
Patent No.: 5,778,203
Issued: Jul. 7, 1998
Appl. No.: 08/724,331
Filed: Oct. 1, 1996

[51] Int. Cl.[7] ................................................... G06F 13/00
[52] U.S. Cl. .......................... 710/126; 710/100; 710/102; 710/129; 701/14
[58] Field of Search ..................................... 710/126, 129, 710/100, 102, 132, 101, 128; 701/14; 370/409

[56] References Cited

U.S. PATENT DOCUMENTS 5,412,651  5/1995  Gorshe .
5,426,774  6/1995  Bannerjee et al. .
5,544,329  8/1996  Engel et al. .

OTHER PUBLICATIONS

Scientific Honeywell, 11 (1991) Fall, No. 1, Minneapolis, MIN, U.S., ARINC 629 and SAFEbus*: Data Buses for Commercial Aircraft, By: Kenneth Hoyme, Kevin Driscoll, Jack Herrlin and Kathie Radke, Publication Date: Jan. 1, 1991, pp. 57–70.

IEEE 1992 National Aerospace and Electronics Conference NAECON 1992, vol. 1, Pave Pillar In–House Research Final Report, By: Jesse Lee Blair and Philip Powers, Publication Date: May 18, 1992, pp. 193–199.

*Primary Examiner*—Rupal Dharia

[57] ABSTRACT

An aircraft control system improves system flexibility, scalability, redundancy, and separation. The system uses a "virtual backplane" architecture which maximizes system flexibility and scalability and allows easy integration of new functions. The architecture comprises four major elements: processing modules; input and output modules (i.e. I/O modules); database modules; and an aircraft wide system network. Inter module communication occurs via the aircraft wide system network thereby eliminating the need for point to point communication and making modules independent of physical location or what modular units (MUs) they are in. Predetermined periodic and deterministic broadcast techniques improve the safety and communications efficiency of the system.

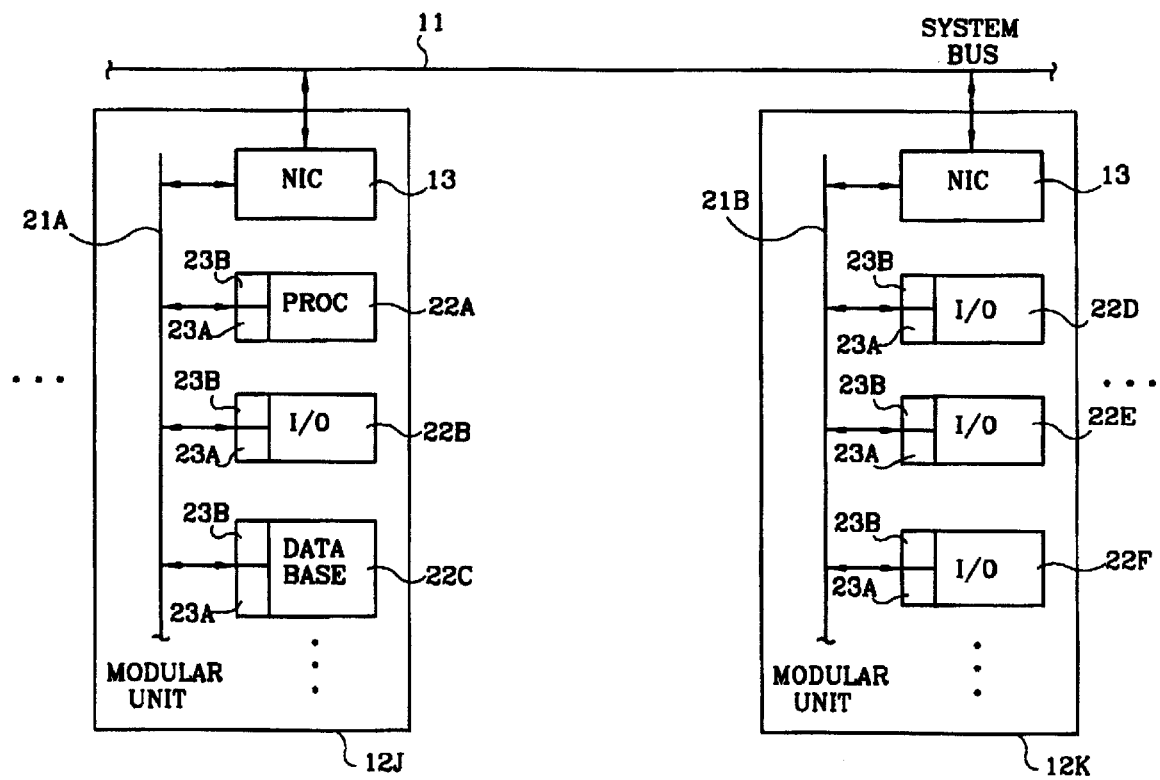

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

\* \* \* \* \*